(12) United States Patent
Pantelias et al.

(10) Patent No.: US 7,843,955 B2
(45) Date of Patent: *Nov. 30, 2010

(54) HARDWARE FILTERING OF UNSOLICITED GRANT SERVICE EXTENDED HEADERS

(75) Inventors: Niki Pantelias, Duluth, GA (US); Kenneth G. Zaleski, II, Dacula, GA (US); Gale Shallow, Marietta, GA (US); Lisa Denney, Suwanne, GA (US)

(73) Assignee: Broadcom Corporation, Irvine, CA (US)

( * ) Notice: Subject to any disclaimer, the term of this patent is extended or adjusted under 35 U.S.C. 154(b) by 931 days.

This patent is subject to a terminal disclaimer.

(21) Appl. No.: 11/546,393

(22) Filed: Oct. 12, 2006

(65) Prior Publication Data

US 2007/0030806 A1 Feb. 8, 2007

Related U.S. Application Data

(63) Continuation of application No. 10/252,420, filed on Sep. 24, 2002, now Pat. No. 7,379,472.

(60) Provisional application No. 60/324,912, filed on Sep. 27, 2001.

(51) Int. Cl.
*H04J 3/16* (2006.01)
*H04B 7/212* (2006.01)

(52) U.S. Cl. .................. 370/443; 370/468

(58) Field of Classification Search ............ None
See application file for complete search history.

(56) References Cited

U.S. PATENT DOCUMENTS

| 6,438,123 B1 | 8/2002 | Chapman |
| 6,490,727 B1 | 12/2002 | Nazarathy et al. |
| 6,594,265 B1 | 7/2003 | Fichou et al. |
| 6,598,057 B1 | 7/2003 | Synnestvedt et al. |
| 6,742,186 B1 | 5/2004 | Roeck |
| 6,856,786 B2 * | 2/2005 | Belostotsky et al. ....... 455/3.03 |
| 6,950,399 B1 | 9/2005 | Bushmitch et al. |

(Continued)

FOREIGN PATENT DOCUMENTS

WO   WO 00/48420 A2   8/2000

(Continued)

OTHER PUBLICATIONS

International Search Report issued Mar. 6, 2003, for Appln. No. PCT/US02/30472, 5 pages.

(Continued)

*Primary Examiner*—Pankaj Kumar
*Assistant Examiner*—Marcus R Smith
(74) *Attorney, Agent, or Firm*—Sterne, Kessler, Goldstein & Fox P.L.L.C.

(57) ABSTRACT

A system and method is presented that uses hardware at a central node to determine if bandwidth being provided to a remote node in accordance with an unsolicited grant service (UGS) flow requires adjustment. In one embodiment, the hardware performs this function by comparing information in two consecutively-received UGS extended headers from the same remote device. If the information in the current and previous UGS extended headers differ, then an indication is provided to software of the central node that the bandwidth being provided to the remote node requires adjustment.

14 Claims, 10 Drawing Sheets

U.S. PATENT DOCUMENTS

| | | |
|---|---|---|
| 7,113,484 B1 | 9/2006 | Chapman et al. |
| 7,177,324 B1 * | 2/2007 | Choudhury et al. ......... 370/468 |
| 7,379,472 B2 | 5/2008 | Pantelias et al. |
| 2007/0030805 A1 | 2/2007 | Pantelias et al. |

FOREIGN PATENT DOCUMENTS

| | | |
|---|---|---|
| WO | WO 01/61983 A2 | 8/2001 |

OTHER PUBLICATIONS

Supplementary Search Report from European Patent Application No. 02778337.2 dated Apr. 7, 2010, 3 pages.

Non-Final Office Action dated Mar. 15, 2010 from U.S. Appl. No. 11/546,379.

* cited by examiner

HARDWARE FILTERING OF UNSOLICITED GRANT SERVICE EXTENDED HEADERS

CROSS REFERENCE TO RELATED APPLICATIONS

This application is a continuation of U.S. patent application Ser. No. 10/252,420, filed Sep. 24, 2002, which issued as U.S. Pat. No. 7,379,472 on May 27, 2008, which claims priority to Provisional U.S. Patent Application No. 60/324,912, filed Sep. 27, 2001.

BACKGROUND OF THE INVENTION

1. Field of the Invention

The present invention is generally related to the filtering of unsolicited grant service (UGS) extended headers to ensure that adequate bandwidth is being provided to a data provider during a UGS flow over a wireless communication system.

2. Background Art

The importance to the modern economy of rapid data access and exchange cannot be overstated. This explains the exponentially increasing popularity of the data access and exchange via cable networks (including coaxial cable or Hybrid fiber coaxial cable), the Internet, intranets, wireless networks, satellites and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide asynchronous communications on cable networks. In general, a user connects a cable modem to the TV outlet for his or her cable TV, and the cable TV operator connects a cable modem termination system ("CMTS") in the operator's headend. The CMTS is a central device for connecting the cable network to a data network like the Internet. The CMTS is a central distribution point for a cable system. Data flows "downstream" from the CMTS to the cable modem (i.e., downstream communication). Alternatively, data flows "upstream" from the cable modem to the CMTS (i.e., upstream communication).

A common cable modem standard today is the Data Over Cable Service Interface Specification ("DOCSIS"). DOCSIS defines technical specifications for both cable modems and CMTS.

In general, a cable modem forwards or provides data via asynchronous communications on cable networks. The cable modem receives data from a user that needs to be transferred via a cable network. For many types of data, in order for the cable modem to transfer the data via a cable network it must request that the CMTS grant to it the necessary bandwidth. Alternatively, when voice traffic is involved, the CMTS automatically grants bandwidth to the cable modem (referred to as unsolicited grant service (UGS)). One reason for this automatic grant of bandwidth is that voice traffic (or traffic data) cannot tolerate delays in its transfer. Therefore, since constant voice traffic is so deterministic (i.e., constant bit rate), the CMTS can generate bandwidth grants at a certain periodicity without the need of bandwidth requests from the data provider (e.g., cable modem).

With UGS, the cable modem calculates the grant size of bandwidth and the periodicity of that grant size of bandwidth that the CMTS needs to supply in order to adequately service a voice call. If the cable modem is supporting more than one user (i.e., phone line) then the cable modem needs to inform the CMTS to supply twice the amount of requested bandwidth with the same periodicity in order to adequately support two voice calls, and so forth. The CMTS may end up not providing enough bandwidth requests to the cable modem if the internal clocks of the CMTS and cable modem differ. For example, the cable modem may require 64 bytes of bandwidth every 3.9999 milliseconds in order to adequately service a voice call. The CMTS may, due to its internal clock being different from the internal clock of the cable modem, may end up granting 64 bytes of bandwidth every 4.0001 milliseconds. Here, the cable modem may end up queuing up data packets that are not getting serviced in a timely manner.

To ensure that the CMTS is adequately providing enough bandwidth to the cable modem for the entire voice call (or current UGS flow), DOCSIS provides a mechanism by which the CMTS software examines consecutive voice packets (i.e., the UGS extended headers of the voice packets) to determine if there is an indication that extra bandwidth grants are needed by the cable modem to service the voice call (i.e., voice packets are backing up in the cable modem queue). Also, once the CMTS starts supplying extra bandwidth grants, the CMTS needs to know when the cable modem no longer requires extra bandwidth grants (i.e., voice packets are not backing up in the cable modem queue). In order to determine when extra bandwidth requests are needed and when the extra bandwidth requests are no longer needed, the CMTS software examines the UGS extended headers of two consecutive voice packets. A change in the UGS extended header indicates a change in the number of grants needed. When there is no change required in the UGS flow, the CMTS software expends unnecessary CPU cycles comparing consecutive voice packets.

BRIEF SUMMARY OF THE INVENTION

The present invention uses hardware to determine if bandwidth being provided to a remote node in accordance with an unsolicited grant service (UGS) flow requires adjustment. In one embodiment, the hardware performs this function by comparing information in two consecutively-received UGS extended headers from the same remote device. If the information in the current and previous UGS extended headers differ, then an indication is provided to software of the central node that the bandwidth being provided to the remote node requires adjustment.

In particular, a central node in a wireless point-to-multipoint communication system in accordance with an embodiment of the present invention includes receiver logic and a hardware-implemented packet engine. The receiver logic is configured to wirelessly receive a voice packet from a remote node in the wireless point-to-multipoint communication system, the voice packet comprising part of an unsolicited grant service flow and including a current indicator data field. The hardware-implemented packet engine is configured (i) to compare the current indicator data field with a previous indicator data field associated with a previously-received voice packet from the remote node to determine if there is a difference between the current and the previous indicator data fields, and (ii) to provide an indication that the bandwidth being provided to the remote node requires adjustment for the unsolicited grant service flow responsive to a determination that there is a difference between the current and the previous indicator data fields.

A central node in a wireless point-to-multipoint communication system, in accordance with an alternate embodiment of the present invention includes receiver logic and a hardware-implemented packet engine. The receiver logic is configured to wirelessly receive a voice packet from a remote node in the wireless point-to-multipoint communication system, the voice packet comprising part of an unsolicited grant service flow and including a voice packet header. The hardware-implemented packet engine is configured (i) to analyze the voice packet header, and (ii) to provide an indication that the bandwidth being provided to the remote node requires adjustment for the unsolicited grant service flow responsive to the analysis of the voice packet header.

BRIEF DESCRIPTION OF THE
DRAWINGS/FIGURES

The present invention will be described with reference to the accompanying drawings, wherein.

Figure 10:
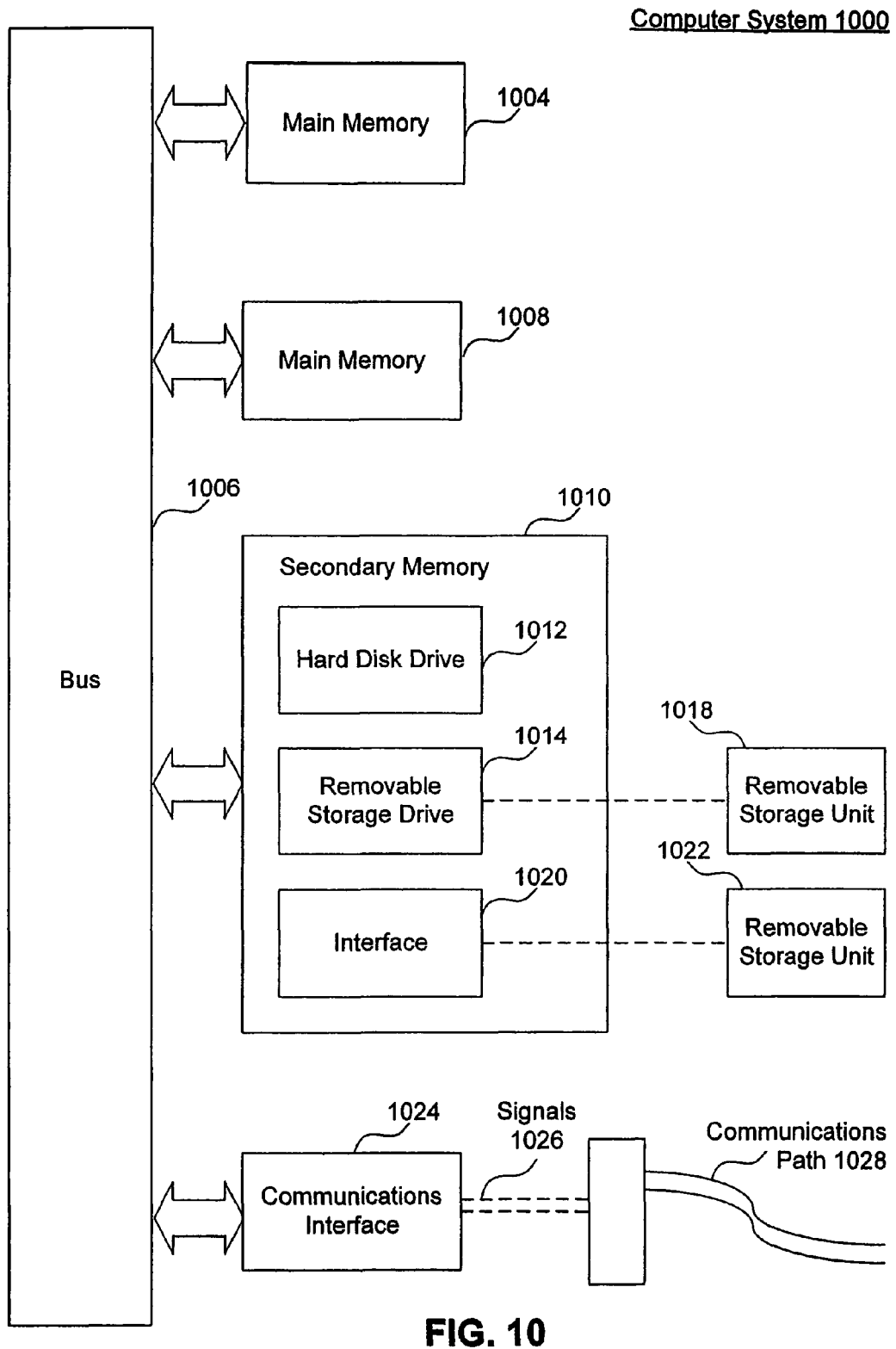

FIG. 10. is a block diagram illustrating how CMTS, CMTS scheduler, cable modem scheduler, connection admission control, packet engine and SDRAM controller may be implemented according to an embodiment of the invention.

DETAILED DESCRIPTION OF THE INVENTION

A. Overview of the Invention
B. Overview of Unsolicited Grant Service
C. System Architecture Overview
D. Voice Packet Format
E. Example Operational Embodiment of the Present Invention
F. Example Environment of the Present Invention
G. Conclusion

A. OVERVIEW OF THE INVENTION

The present invention, by using hardware instead of software to compare for bandwidth request changes between two consecutively received unsolicited grant service (UGS) extended headers for the same SID, obtains significant savings in CPU cycles for the CMTS software. For illustration purposes, the present invention is described in terms of being utilized with a cable network and DOCSIS. It should be understood that the present invention is independent of the actual physical layer of transmission utilized by DOCSIS (e.g., TDMA, SCDMA, etc.). It should also be understood that the present invention is not limited to use with a cable network and/or DOCSIS. In fact, the present invention may be used with any communication medium, including but not limited to, the Internet, intranets, fiber optic networks, wireless networks and satellite-based networks.

The present invention is described with reference to voice traffic or voice data. But, data in the present invention includes any type of information that is deterministic (i.e., a constant bit rate), such as voice traffic. Thus, the present invention can be used for any constant bit rate source. Prior to discussing the specifics of the present invention, an overview of unsolicited grant service (UGS) is provided.

B. OVERVIEW OF UNSOLICITED GRANT
SERVICE

Figure 1:
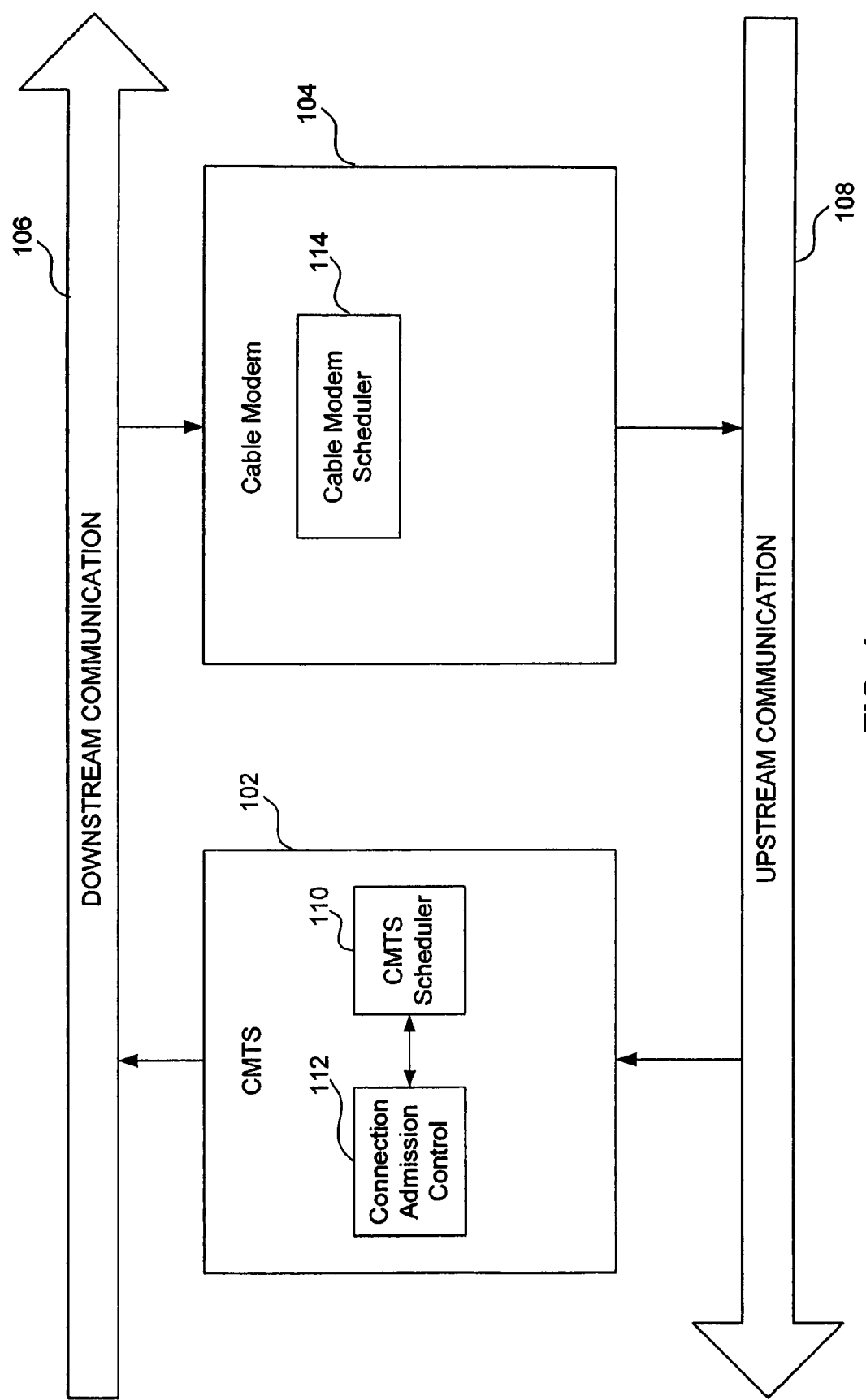
FIG. 1 is a block diagram representing an example operating environment for unsolicited grant service according to an embodiment of the present invention.

FIG. 1 is a block diagram representing an example operating environment for unsolicited grant service. It should be understood that the example operating environment in FIG. 1 is shown for illustrative purposes only and does not limit the invention. Referring to FIG. 1, a cable modem termination system (CMTS) 102, a cable modem 104, downstream communication 106 and upstream communication 108 are shown. CMTS 102 further includes a CMTS scheduler 110 and a connection admission control 112. Cable modem 104 further includes a cable modem scheduler 114. Each of these components will be briefly described next.

In general, cable modem 104 forwards or provides data via asynchronous communications on cable networks. Cable modem 104 receives data from a user that needs to be transferred via a cable network. For many types of data, in order for cable modem 104 to transfer the data via a cable network it must request that CMTS 102 grant to it the necessary bandwidth. Alternatively, when voice traffic is involved, CMTS 102 automatically grants bandwidth to cable modem 104. One reason, among others, for this automatic grant of bandwidth is that voice traffic (or traffic data) cannot tolerate delays in its transfer. Therefore, since constant voice traffic is so deterministic (i.e., constant bit rate), CMTS 102 can generate bandwidth grants at a certain periodicity without the need of bandwidth requests from the data provider (e.g., cable modem).

Packetized voice generates a fixed size packet at deterministic instants. This means that cable modem 104 requires an upstream transmission opportunity at regular intervals of time. The periodicity depends on packetization of voice. One example that is not meant to limit the present invention is when G.711 PCM voice generates a byte of data every 125 microsecs or 64 Kbps. If these bytes are accumulated into 10 ms packets, the packet size would be 80 bytes of data. Therefore, every 10 ms, cable modem 104 will need enough upstream bandwidth to transmit 80 bytes of data plus packetization overhead. As mentioned above, if the internal clocks of cable modem 104 and CMTS 102 differ, then cable modem 104 may request extra bandwidth for some period of time.

Cable modem scheduler 114 of cable modem 104 is responsible for multiplexing the internal traffic (i.e., requesting the necessary bandwidth that cable modem 104 needs to transfer its current types of data). Cable modem scheduler 114 must take into consideration the different priorities given to the current data to be transferred and to request bandwidth from CMTS 102 accordingly.

CMTS 102 is a central device for connecting the cable network to a data network. CMTS scheduler 110 is a bandwidth manager that decides how to grant available bandwidth according to the current bandwidth requests. Connection admission control 112 decides whether or not to admit more traffic in the system. The functionality of connection admission control 112 may be implemented completely within CMTS 102, as shown in FIG. 1. In alternative embodiments, the functionality of connection admission control 112 may be implemented completely outside of CMTS 102, or the functionality of connection admission control 112 may be split between CMTS 102 and another component.

A high level flowchart of unsolicited grant service (UGS) will be described next with reference to FIG. 6.

Figure 6:
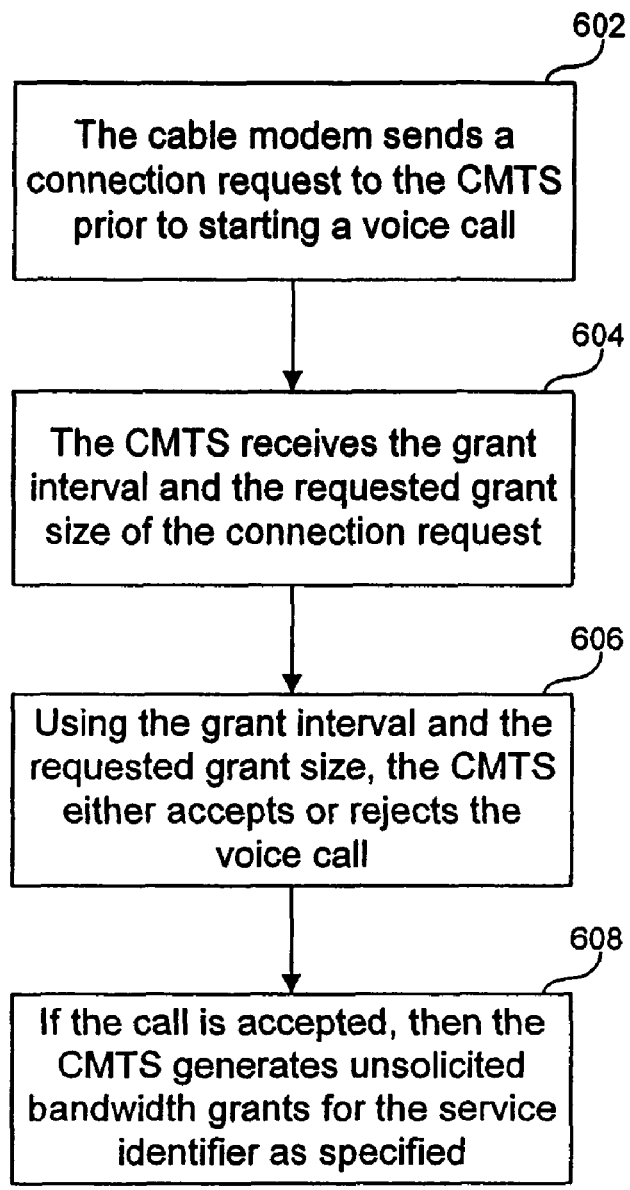
FIG. 6 is a high level flowchart of unsolicited grant service (UGS) according to an embodiment of the invention.

In FIG. 6, control starts at step 602. In step 602, cable modem 104 sends a connection request to CMTS 102 prior to starting a voice call via upstream communication 108. A connection connect consists of a grant interval (i.e., periodicity) and a grant size. The grant interval is the time period between successive grants. The grant size represents how big each grant of bandwidth needs to be. Control then passes to step 604.

In step 604, CMTS 102 receives the grant interval and the requested grant size of the connection request. Control then passes to step 606.

In step 606, using the grant interval and the requested grant size of the connection request, CMTS 102 (via connection admission control 112) either accepts or rejects the voice call. Here, voice calls are supported in a connection-based mode. Control then passes to step 608.

In step 608, if the call is accepted, then CMTS 102 generates bandwidth grants via downstream communication 106 for the service identifier (or cable modem 104) as specified as long as cable modem 104 keeps forwarding voice packets to be serviced. The flowchart in FIG. 6 ends at this point.

As stated above, to ensure that CMTS 102 is adequately providing enough bandwidth to cable modem 104 for the entire voice call (or current UGS flow), DOCSIS provides a mechanism by which the CMTS software examines consecutive voice packets (i.e., the UGS extended headers of the voice packets) to determine if there is an indication that extra bandwidth grants are needed by cable modem 104 to service the voice call (i.e., voice packets are backing up in the cable modem queue). Also, once CMTS 102 starts supplying extra bandwidth grants, CMTS 102 needs to know when cable modem 104 no longer requires extra bandwidth grants (i.e., voice packets are not backing up in the cable modem queue). In order to determine when extra bandwidth grants are needed and when the extra bandwidth grants are no longer needed, the CMTS software examines the UGS extended headers of two consecutive voice packets. When there is no change required in the UGS flow, the CMTS software expends unnecessary CPU cycles comparing consecutive voice packets. The present invention shifts the duty of examining consecutive voice packets from software to hardware, thereby obtaining significant savings in CPU cycles for the CMTS software. The example operating environment of the present invention is described next.

C. SYSTEM ARCHITECTURE OVERVIEW

Figure 2:
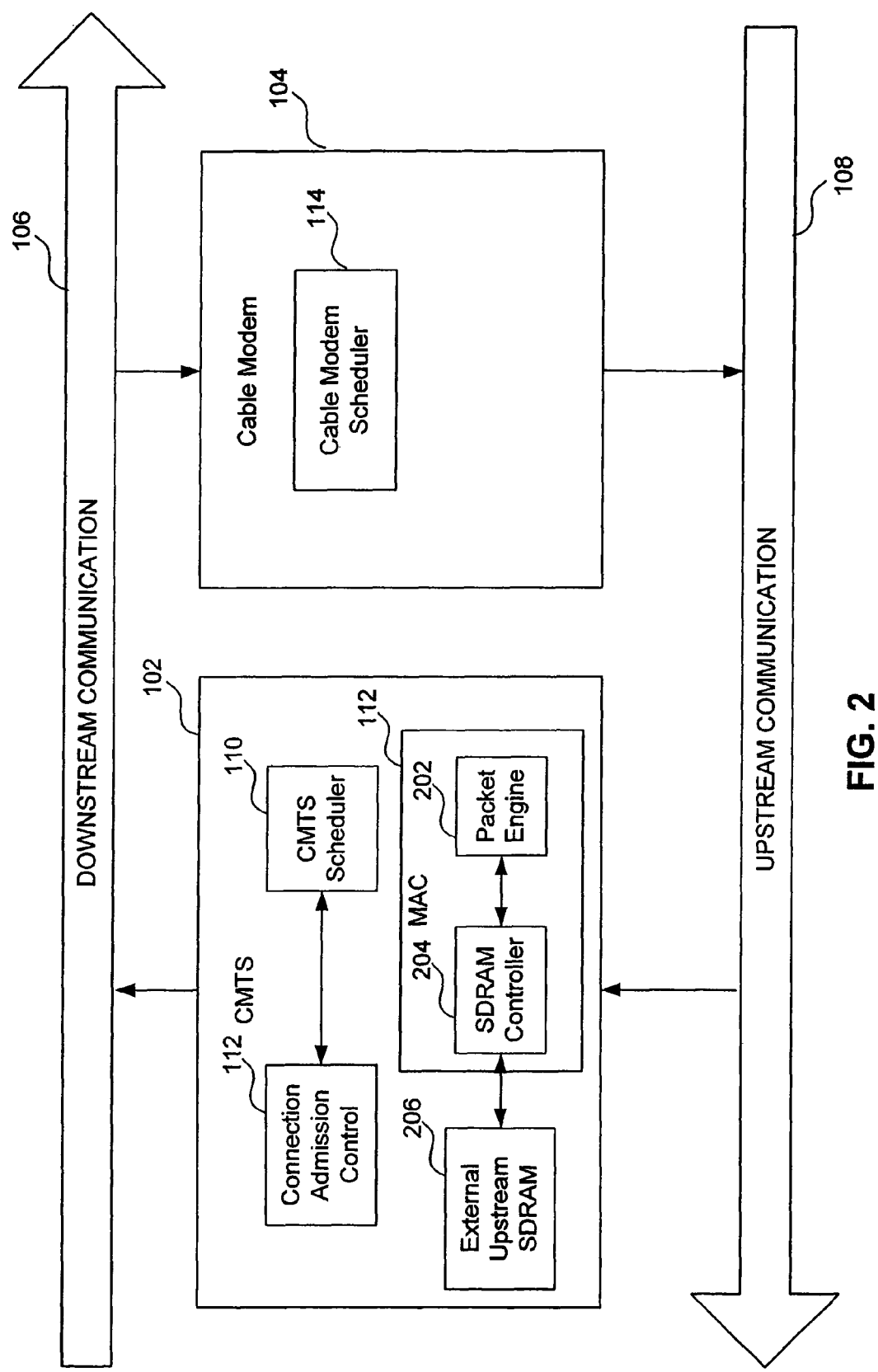
FIG. 2 is a block diagram representing an example operating environment according to an embodiment of the present invention.

FIG. 2 is a block diagram representing an example operating environment of the present invention. It should be understood that the example operating environment in FIG. 2 is shown for illustrative purposes only and does not limit the invention. Other implementations of the operating environment described herein will be apparent to persons skilled in the relevant art(s) based on the teachings contained herein, and the invention is directed to such other implementations.

In addition to the components described with reference to FIG. 1 above, FIG. 2 shows CMTS 102 includes a MAC 201 (media access controller) and an external upstream SDRAM 206. MAC 201 includes a packet engine 202 and a SDRAM (synchronous dynamic random access memory) controller 204. MAC 201 separates the UGS extended header from the data in the voice packet and sends the header to packet engine 202 for processing (instead of the CMTS software). Packet engine 202 is implemented in hardware. As the CMTS software did previously, packet engine 202 examines the UGS extended headers for the same SID of consecutive voice packets as they are forwarded from cable modem 104 to CMTS 102 during a voice call.

External upsteam SDRAM 206 is external memory utilized by the present invention as will be described below. In general, SDRAM is memory that can run at much higher clock speeds than conventional memory. SDRAM actually synchronizes itself with the CPU's bus. It is important to note that the present invention is not limited to using external upsteam SDRAM. Other types of memory including internal SRAM, internal register space, external RAMBUS memory, and so forth, may also be used by the present invention. The present invention is explained in terms of external upstream SDRAM for illustration purposes only.

Finally, SDRAM controller 204 is responsible for issuing all read and write requests to external upstream SDRAM 206. As discussed above, SDRAM controller could also be a SRAM controller, and so forth, depending on the type of memory used with the invention. The hardware components that make up packet engine 202 are described next with reference to FIG. 3.

Figure 3:
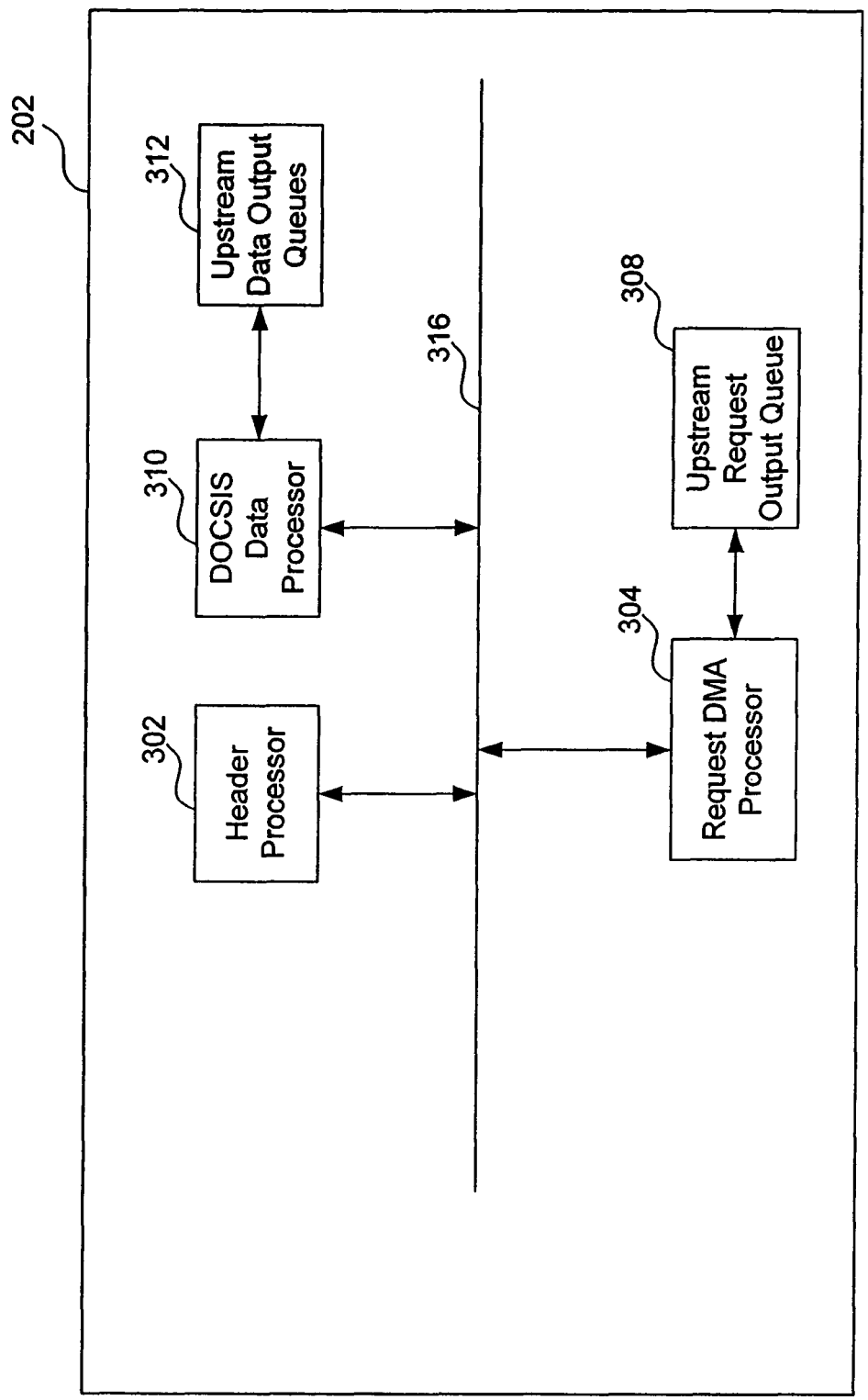
FIG. 3 illustrates the hardware components that make up the packet engine according to an embodiment of the present invention.

In FIG. 3, packet engine 202 is comprised of a header processor 302, a request DMA (direct memory access) processor 304 and a DOCSIS data processor 310. Request DMA processsor 304 is coupled to an upstream request output queue 308 to make up the request path. (As will be described below, packet engine 202 processes the UGS extended header to create a packet in a TLV (type length value) format. The TLV packet contains information about the UGS extended header and travels the request path via request DMA processsor 304 and upstream request output queue 308.) DOCSIS data processor 310 is coupled with upstream data output queues 312 to make up the data path. Header processor 302, request DMA processor 304 and DOCSIS data processor 310 communicate with each other via a bus 316. The utility of each of these hardware components and how they operate together to ensure adequate bandwidth is being granted to cable modem 104 during the current UGS flow is described below.

Figure 4:
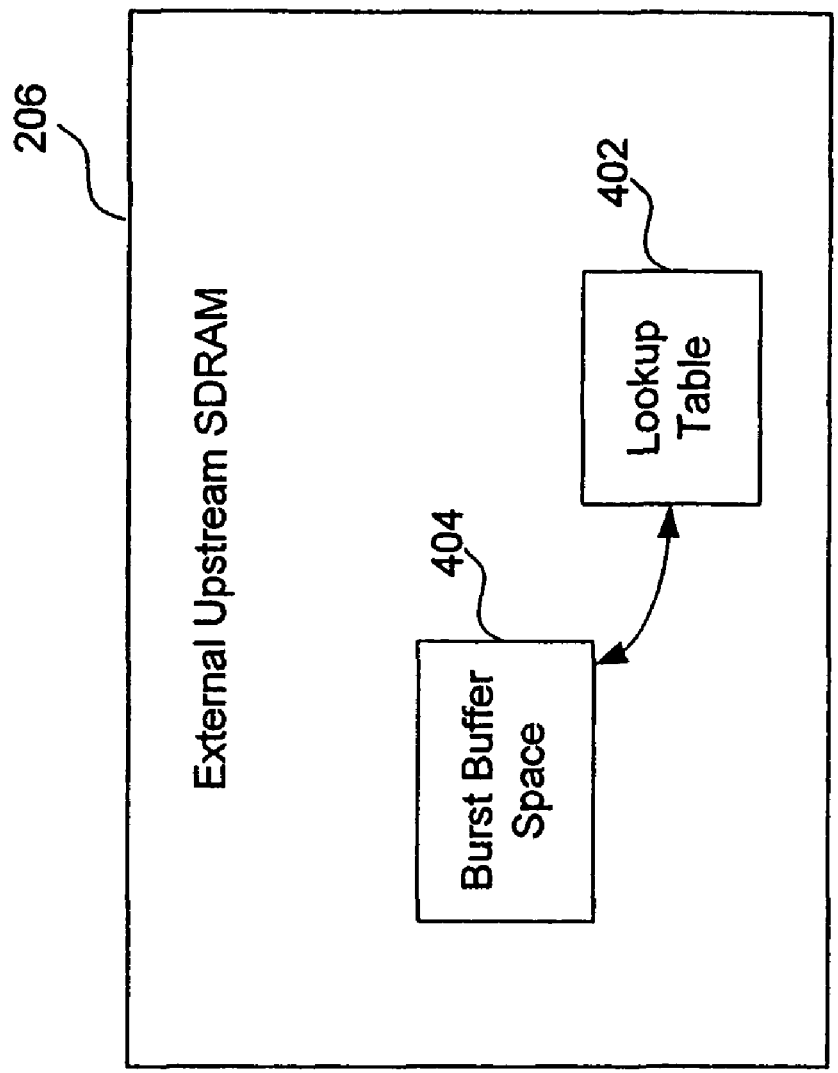
FIG. 4 illustrates the hardware components of external upstream SDRAM that are utilized by the present invention according to an embodiment.

FIG. 4 illustrates that external upstream SDRAM 206 has a lookup table 402. The utility of lookup table 402 is also described below. An example format of a voice packet is described next with reference to FIG. 5.

D. VOICE PACKET FORMAT

Figure 5:
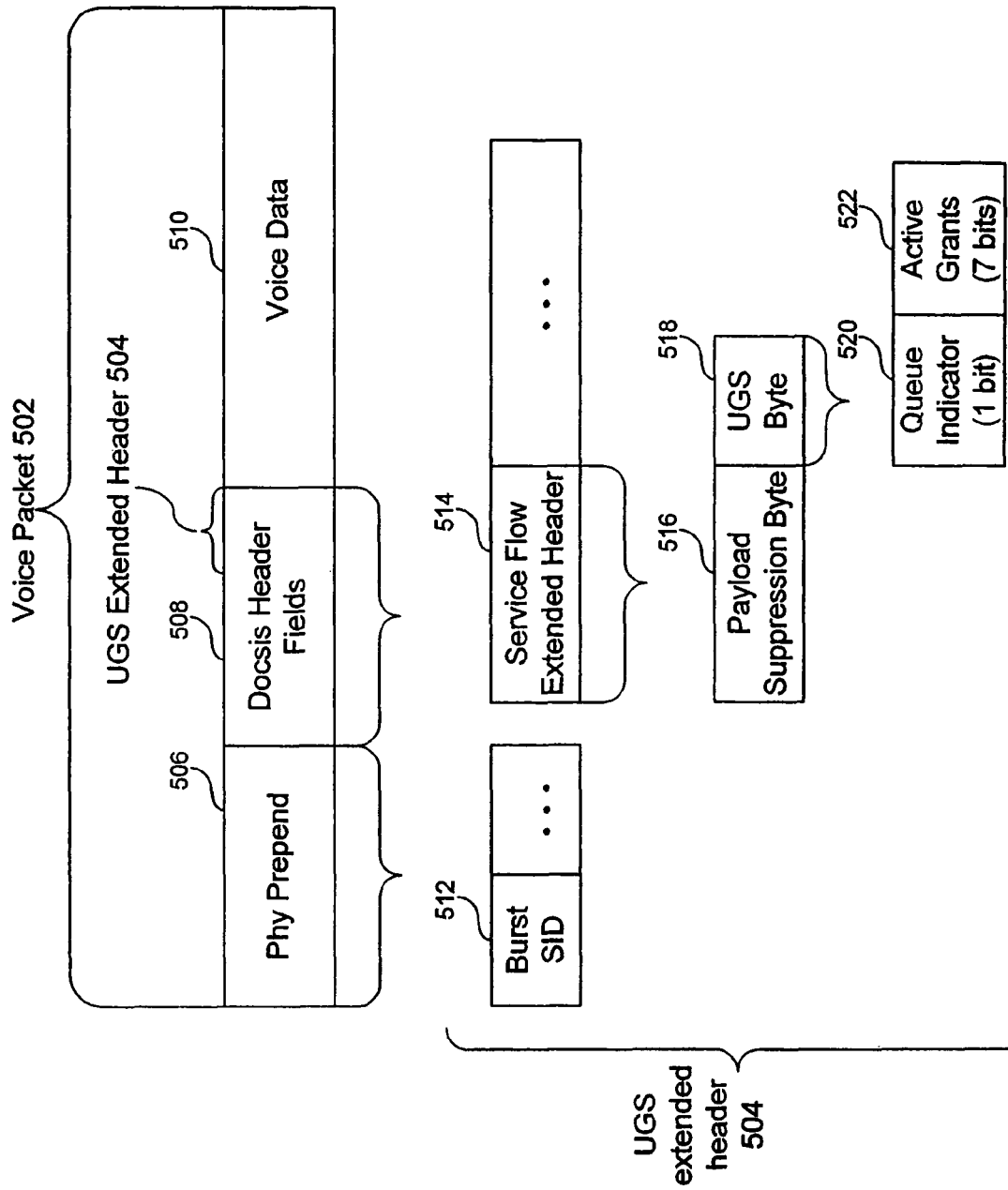
FIG. 5 illustrates an example format of an individual voice packet used by the present invention according to an embodiment.

FIG. 5 illustrates an example format of an individual DOCSIS voice packet used by the present invention according to an embodiment. The DOCSIS voice packet format is well known and is described briefly herein. An individual voice packet 502 includes a PHY prepend 506, DOCSIS header fields 508, an UGS extended header 504 (which is a subset of DOCSIS header fields 508) and voice data 510. UGS extended header 504 includes a burst SID 512 and a service flow extended header 514. Service flow extended header 514 includes a payload suppression byte 516 and a UGS byte 518. UGS byte 518 includes a one bit queue indicator 520 and a seven bit active grants 522. Most significant to the present invention are queue indicator 520 and active grants 522 of UGS byte 518. When queue indicator 520 is set, this indicates to MAC 201 that cable modem 104 has extra voice packets that need bandwidth. Active grants 522 indicates to MAC 201 how many phone lines supported by cable modem 104 are currently active, and thus need bandwidth.

Another application of active grants 522 is called activity detection. Here, during a phone call, if one end is silent then there is no need in transmitting data packets with no data and sending the cable modem a grant it does not need. Bandwidth can be freed up if the cable modem reduces the value of active grants 522 by one to cause the CMTS to take away one of the grants. When the silent end becomes active again, then the cable modem increases the value of active grants 522 and the CMTS gives back the grant. An example operational embodiment of the present invention is described next.

E. EXAMPLE OPERATIONAL EMBODIMENT OF THE PRESENT INVENTION

Figure 7:
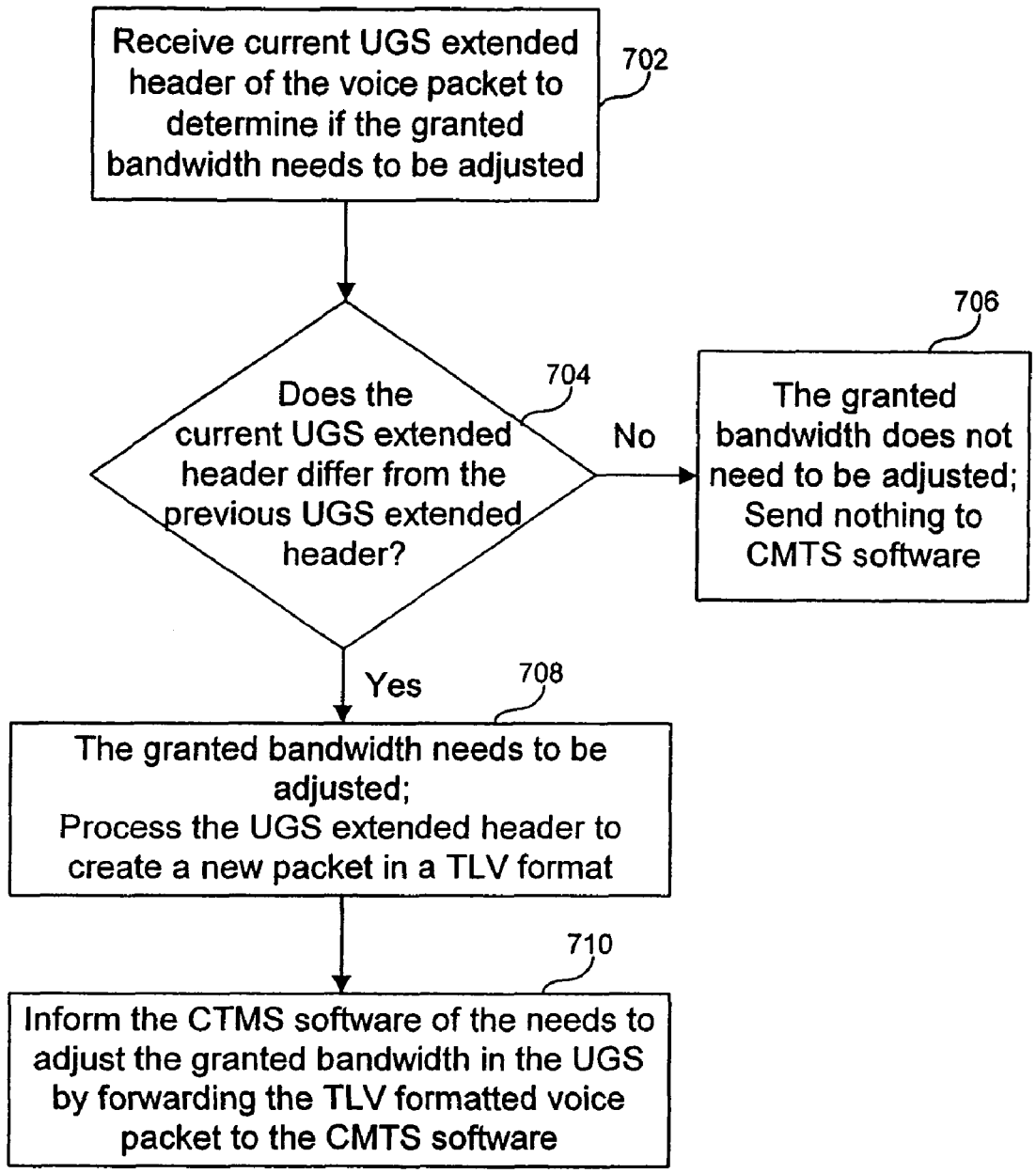
FIG. 7 illustrates a high level operational embodiment of the present invention.

FIG. 7 illustrates a high level operational embodiment of the present invention. In FIG. 7, control starts at step 702. In step 702, cable modem 104 forwards a voice packet 502 (i.e., current voice packet) on upstream communication 108 and is received by MAC 201. Here, MAC 201 forwards only UGS extended header 504 from voice packet 502 to packet engine 202. Control then passes to step 704.

In step 704, packet engine 202 determines whether the UGS extended header of the current voice packet differs from the UGS extended header of the previous voice packet of the flow of a UGS flow (or voice call) (i.e., packet engine 202 compares the value of queue indicator 520 in the UGS extended header of the current and previous voice packets). In addition, packet engine 202 also compares the value of active grants 522 in the UGS extended header of the current and previous voice packets. Note that the first voice packet forwarded by cable modem 104 of the voice call will generate an error since there is no previous voice packet to compare it to. This is generally ignored by the present invention other than to store the relevant information so that the next voice packet and the first voice packet can be compared. If it is determined by step 704 that there is a difference between the current and previous UGS extended headers for that SID, then control passes to step 708. Alternatively, control passes to step 706.

In step 706, cable modem 104 does not currently need extra bandwidth requests to adequately service its voice call(s). Here, nothing is sent to the CMTS software, thereby expending no CPU cycles.

In step 708, the bandwidth being granted by CMTS 102 to cable modem 104 is not adequate for the UGS flow. Here, packet engine 202 processes the UGS extended header to create a packet in a TLV (type length value) format. The TLV packet contains information about the UGS extended header and travels the request path via request DMA processsor 304 and upstream request output queue 308 (FIG. 3). The TLV format is well known and is generally used to tell the CMTS software the type of information and where the information begins. The TLV format is more easily processed by the CMTS software. Control then passes to step 710.

In step 710, the present invention informs the CMTS software of the need to adjust the granted bandwidth in the current UGS flow by forwarding the TLV formatted packet to the CMTS software for processing. Thus, the only time the CMTS software expends CPU cycles is when the granted bandwidth for the current UGS flow is not adequate. The flowchart in FIG. 7 ends at this point. TLV formatting of the present invention is described next.

Each type of information processed in step 708 is formatted into a TLV coding. Here, the type and length fields are the upper and lower nibbles of a single T-L byte. The "type" values chosen are based on those used for DOCSIS extended headers. For example, UGS extended header information is one type field. The length field for all encoding is typically chosen so that all data remains 32-bit-aligned for easier consumption by the CMTS software. The following Table 1 illustrates the eight bytes of TLV encoding for UGS extended header information.

TABLE 1

| Number of Bytes | Information |
|---|---|
| 1 | Type (4 bits), Length (4 bits) |
| 2 | SID (14 bit SID lsb-justified in field) |
| 1 | UGS byte (the byte from the original extended header representing UGS information) |
| 1 | ChID (1 byte containing Channel ID byte for the upstream channel on which the UGS header arrived) |
| 3 | Rsvd (3 bytes are reserved and should be written with zero; these bytes are present for 32-bit alignment) |

Step 704 of FIG. 7 is next described in more detail with reference to FIG. 8 further illustrating how the present invention determines whether the current and previous UGS extended headers differ.

Figure 8:
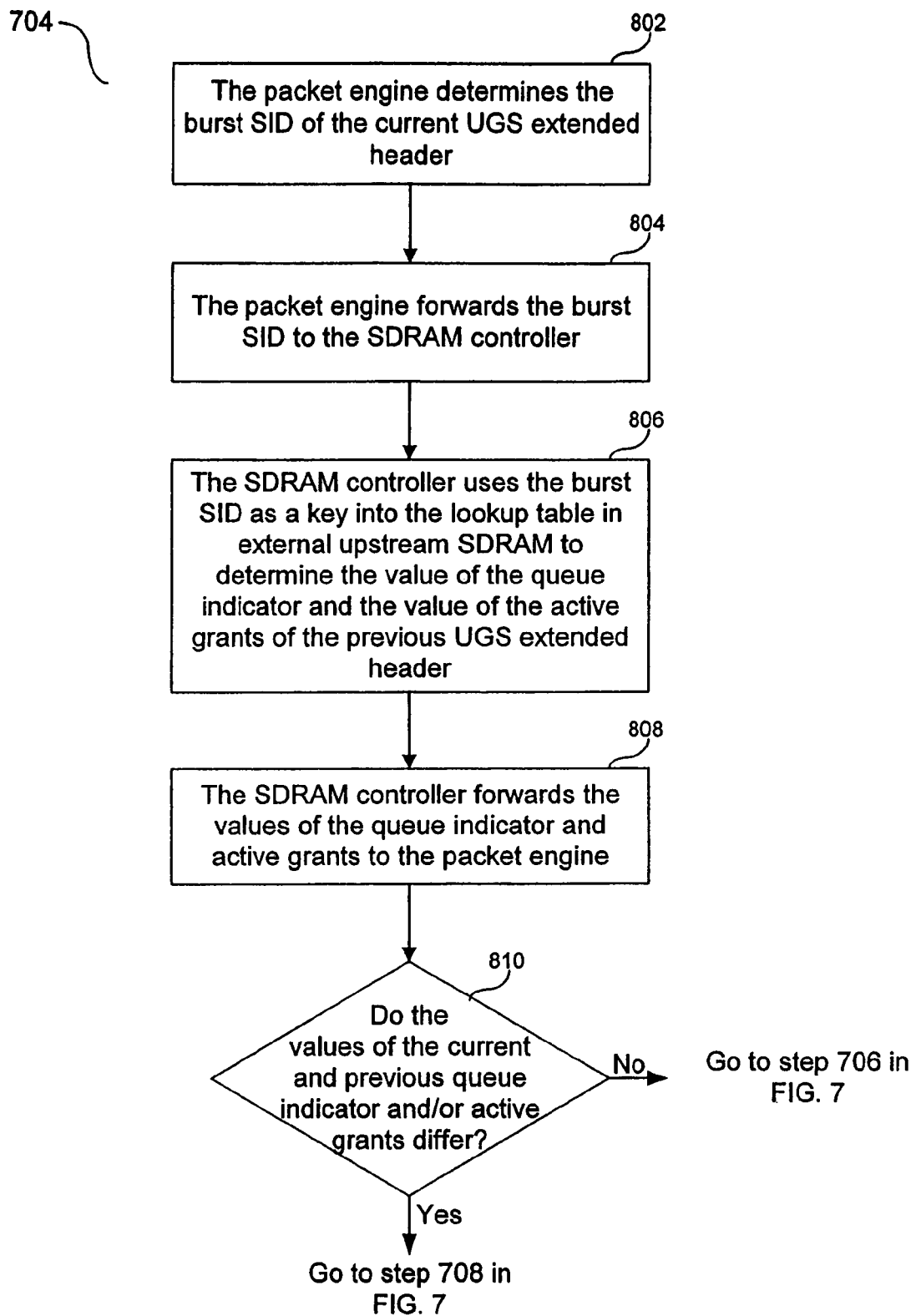
FIG. 8 is a flowchart illustrating how the present invention determines whether the current and previous UGS extended headers for the same SID differ according to an embodiment.

In FIG. 8, control starts at step 802. In step 802, packet engine 202 determines the value of the burst SID of the current UGS extended header. Control then passes to step 804.

In step 804, packet engine 202 forwards the burst SID to SDRAM controller 204. Control then passes to step 806.

In step 806, SDRAM controller 204 uses the burst SID as a key or index into lookup table 402 in external upstream SDRAM 206 to determine the value of the queue indicator and the value of the active grants of the previous UGS extended header. As described above, when the queue indicator is set, this indicates to MAC 201 that cable modem 104 has extra voice packets that need bandwidth. The active grants field indicates to MAC 201 how many phone lines supported by cable modem 104 are currently active for this SID, and thus need bandwidth. Control then passes to step 808.

In step 808, SDRAM controller 204 forwards the value of the queue indicator and the value of the active grants to packet engine 202. Control then passes to step 810.

In step 810, packet engine 202 compares the current and previous values of the queue indicator and the current and previous values of the active grants. Note that with regard to the queue indicator, if the previous queue indicator was not set and the current queue indicator is set then this indicates to the present invention that cable modem 104 needs extra bandwidth. Alternatively, if the previous queue indicator was set and the current queue indicator is not set then this indicates to the present invention that cable modem 104 no longer needs extra bandwidth. Also note that with regard to the active grants, if the previous value of the active grants is less than the current value of the active grants then this indicates to the present invention that cable modem 104 has started servicing an additional one or more voice calls on that SID and thus needs extra bandwidth. Alternatively, if the previous value of the active grants is more than the current value of the active grants then this indicates to the present invention that cable modem 104 has stopped servicing one or more voice calls and thus no longer needs the extra bandwidth.

In step 810, if either the two values for the queue indicator or the active grants differ, then control passes to step 708 in FIG. 7. Alternatively, control passes to step 706 in FIG. 7. The flowchart in FIG. 8 ends at this point. Step 708 of FIG. 7 is described next in more detail with reference to FIG. 9 further illustrating how the present invention processes the UGS extended header to create a packet in a TLV format.

Figure 9:
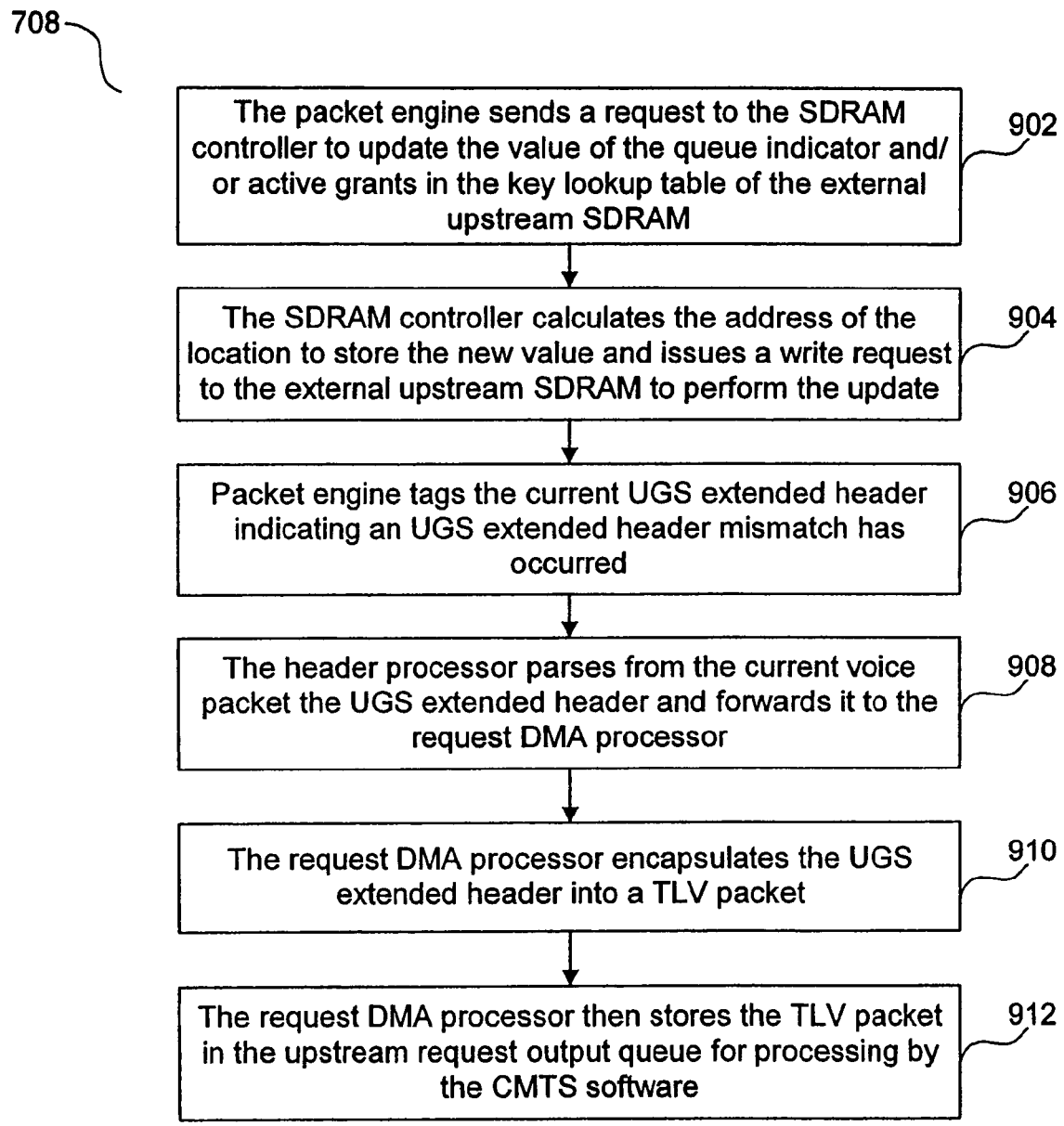
FIG. 9 is a flowchart illustrating how the present invention processes the UGS extended header to create a new voice packet in a TLV format according to an embodiment.

In FIG. 9, control starts at step 902. In step 902, packet engine 202 sends a request to SDRAM controller 204 to update the value of the queue indicator and/or active grants stored in lookup table 402 of external upstream SDRAM 206. It is important to note that in the case where the current and previous queue indicator and/or active grants do not differ, then there is no need to update its respective value stored in lookup table 402. Control then passes to step 904.

In step 904, SDRAM controller 204 calculates the address of the location to store the new value(s) and issues a write request to external upstream SDRAM 206 to perform the update. Control then passes to step 906.

In step 906, packet engine 202 tags the current UGS extended header indicating an UGS extended header mismatch has occurred. Control then passes to step 908.

In step 908, header processor 302 parses from the current voice packet the UGS extended header and forwards it to request DMA processor 304. Control then passes to step 910.

In step 910, request DMA processor 304 encapsulates the UGS extended header into a TLV packet. Control then passes to step 912.

In step 912, request DMA processor 304 stores the TLV packet in upstream request output queue 308 for processing by the CMTS software. This indicates to the CMTS software that the bandwidth being granted to cable modem 104 needs to be adjusted by supplying either more or less bandwidth grants.

F. EXAMPLE ENVIRONMENT OF THE PRESENT INVENTION

CMTS 102, CMTS scheduler 110, cable modem scheduler 114, connection admission control 112, MAC 201, packet engine 202, SDRAM controller 204 and DOCSIS data processor 310 may be implemented using computer 1000 as shown in FIG. 10. Obviously, more than one of these functional components could be implemented on a single computer 1000.

As stated above, the present invention is preferably implemented in hardware. Yet, one or more components of the present invention may be implemented using hardware, software or a combination thereof and may be implemented in a computer system or other processing system. In fact, in one embodiment, the invention is directed toward one or more computer systems capable of carrying out the functionality described herein. The computer system 1000 includes one or more processors, such as processor 1004. The processor 1004 is connected to a communication bus 1006. Various software embodiments are described in terms of this example computer system. After reading this description, it will become apparent to a person skilled in the relevant art how to implement the invention using other computer systems and/or computer architectures.

Computer system 1000 also includes a main memory 1008, preferably random access memory (RAM), and can also include a secondary memory 1010. The secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1018 to computer system 1000.

Computer system 1000 can also include a communications interface 1024. Communications interface 1024 allows software and data to be transferred between computer system 1000 and external devices. Examples of communications interface 1024 can include a modem, a network interface (such as an Ethernet card), a communications port, a PCM-CIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1018, a hard disk installed in hard disk drive 1012, and signals 1026. These computer program products are means for providing software to computer system 1000.

Computer programs (also called computer control logic) are stored in main memory and/or secondary memory 1010. Computer programs can also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

G. CONCLUSION

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described example embodiments, but should be defined only in accordance with the following claims and their equivalents.

What is claimed is:

1. A central node in a wireless point-to-multipoint communication system, comprising:
    receiver logic configured to wirelessly receive a voice packet from a remote node in the wireless point-to-multipoint communication system, the voice packet comprising part of an unsolicited grant service flow and including a current indicator data field; and
    a hardware-implemented packet engine configured (i) to compare the current indicator data field with a previous indicator data field associated with a previously-received voice packet from the remote node to determine if there is a difference between the current and the previous indicator data fields, and (ii) to provide an indication that the bandwidth being provided to the remote node requires adjustment for the unsolicited grant service flow responsive to a determination that there is a difference between the current and the previous indicator data fields.

2. The central node of claim 1, wherein the hardware-implemented packet engine is configured to provide an indication that the bandwidth being provided to the remote node requires adjustment to software of the central node.

3. The system of claim 1, wherein the packet engine is configured to provide an indication that the bandwidth needs to be increased.

4. The system of claim 1, wherein the packet engine is configured to provide an indication that the bandwidth needs to be decreased.

5. The system of claim 1, wherein the packet engine is further configured to process the current indicator data field into a type/length/value (TLV) format to create a TLV packet.

6. The system of claim 1, further comprising a memory for storing the previous indicator data field.

7. The system of claim 6, wherein the memory is synchronous dynamic random access memory.

8. The system of claim 6, wherein the memory is static random access memory.

9. The system of claim 6, wherein the memory is a register space.

10. The system of claim 6, wherein the packet engine is further configured to send a request to the memory to replace the previous indicator data field stored in the memory with the current indicator data field.

11. The system of claim 1, further comprising:
    a data field processor configured to parse the current indicator data field from the voice packet; and
    a request direct memory access (DMA) processor configured to encapsulate the current data field indicator into a new packet for processing by the software of the central node.

12. The system of claim 11, wherein the new packet is in a type/length/value (TLV) format.

13. The system of claim 11, wherein the new packet is stored in an uplink request output queue.

14. A central node in a wireless point-to-multipoint communication system, comprising:
    receiver logic configured to wirelessly receive a voice packet from a remote node in the wireless point-to-multipoint communication system, the voice packet comprising part of an unsolicited grant service flow and including a voice packet header; and
    a hardware-implemented packet engine configured (i) to analyze the voice packet header without a respective request for bandwidth from the remote node and (ii) to provide an indication that the bandwidth being provided to the remote node requires adjustment for the unsolicited grant service flow responsive to the analysis of the voice packet header.

* * * * *